US012164556B2

(12) United States Patent
Sharifi et al.

(10) Patent No.: US 12,164,556 B2
(45) Date of Patent: Dec. 10, 2024

(54) SMART SUGGESTIONS FOR IMAGE ZOOM REGIONS

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 286 days.

(21) Appl. No.: 17/336,000

(22) Filed: Jun. 1, 2021

(65) Prior Publication Data
US 2022/0382802 A1    Dec. 1, 2022

(51) Int. Cl.
*G06F 17/00*     (2019.01)
*G06F 7/00*      (2006.01)
*G06F 16/532*    (2019.01)
*G06T 3/40*      (2006.01)

(52) U.S. Cl.
CPC ............ *G06F 16/532* (2019.01); *G06T 3/40* (2013.01)

(58) Field of Classification Search
CPC .................. G06F 16/532; G06T 3/40
USPC ............................................. 707/736
See application file for complete search history.

(56) References Cited

U.S. PATENT DOCUMENTS

| 6,532,312 B1* | 3/2003 | Corkran ............... G06T 11/00 382/284 |
| 9,582,482 B1* | 2/2017 | Sharifi ................ G06F 16/5866 |
| 2004/0003001 A1* | 1/2004 | Shimura ................ G16H 30/20 707/E17.024 |
| 2005/0013504 A1* | 1/2005 | Noma ..................... G01C 25/00 382/255 |
| 2005/0111618 A1* | 5/2005 | Sommer, Jr. ............ B64F 1/368 378/57 |
| 2007/0229658 A1* | 10/2007 | Kanamori ................ G06T 3/40 348/207.99 |
| 2011/0225541 A1* | 9/2011 | Ramos ................... G09B 29/10 715/790 |
| 2011/0265030 A1* | 10/2011 | Lin ........................ G06T 11/60 715/790 |
| 2013/0132867 A1* | 5/2013 | Morris .................... G06F 3/048 715/759 |
| 2013/0169803 A1* | 7/2013 | Ardo ........................ H04N 7/18 348/143 |

(Continued)

OTHER PUBLICATIONS

Mikulik, A. et at., "Image Retrieval for Online Browsing in Large Image Collections"; LNCS 8199, Springer; pp. 3-15; dated Oct. 2, 2013.

(Continued)

*Primary Examiner* — Pavan Mamillapalli
(74) *Attorney, Agent, or Firm* — Gray Ice Higdon

(57) ABSTRACT

Techniques are described herein for providing smart suggestions for image zoom regions. A method includes: receiving a search query; performing a search using the search query to identify search results that include image search results including a plurality of images that are responsive to the search query; for a given image of the plurality of images included in the image search results, determining at least one zoom region in the given image; and providing the search results including the image search results, including providing the given image and an indication of the at least one zoom region in the given image.

20 Claims, 7 Drawing Sheets

(56) References Cited

U.S. PATENT DOCUMENTS

| | | | |
|---|---|---|---|
| 2015/0170333 A1* | 6/2015 | Jing | G06F 16/532 |
| | | | 345/660 |
| 2016/0275150 A1* | 9/2016 | Bournonnais | G06F 16/25 |
| 2017/0330336 A1* | 11/2017 | Roblek | G06F 16/434 |
| 2018/0129653 A1* | 5/2018 | Wang | G06F 3/0485 |
| 2018/0173692 A1* | 6/2018 | Greenberg | G06F 3/04842 |
| 2021/0201051 A1* | 7/2021 | Deselaers | G06N 20/00 |

OTHER PUBLICATIONS

European Patent Office; International Search Report and Written Opinion of Application No. PCT/US2022/031596; 16 pages; dated Sep. 6, 2022.

\* cited by examiner

SMART SUGGESTIONS FOR IMAGE ZOOM REGIONS

BACKGROUND

Individuals (also referred to herein as "users") often perform online research by submitting search queries that may return search results that include images. Users may also search for particular images by submitting image search queries. When users are browsing search results that include images or images returned in response to an image search query, the users may be interested in specific aspects of one or more of the images. For example, users may be interested in a specific object of interest that is included within one or more of the images or a specific piece of information that is contained within one or more of the images, among other visual information. The specific object of interest may be, for example, a specific part in a vehicle parts diagram or a specific toy.

Users may browse search results that include images, images returned in response to an image search query, and/or image collections on mobile devices or other computing devices with limited screen real estate that may not be able to render the images at their native resolution. Accordingly, users may zoom into specific areas of the images to view finer details. By zooming into the images, users may be able to more clearly view a specific object of interest that is included within one or more of the images or a specific piece of information that is contained within one or more of the images. However, image zooming can be a time consuming process that requires a user's full focus and dexterity as the user fine tunes the zoom location and zoom level, and as a result, can lead to excess usage of power resources and/or other computational resource(s) of a client device used in manually performing image zooming.

SUMMARY

Implementations disclosed herein relate to providing smart suggestions for image zoom regions. Implementations may automatically suggest one or more image zoom regions in one or more images, such as images returned in response to a search query. Each of the automatically suggested image zoom regions may be indicated by a selectable target, and in response to a selection of the target by a user (e.g., by tapping on the target or by clicking on the target), the image may be automatically zoomed in on a display, at a location in the image that is associated with the selectable target. Accordingly, a particular portion of the image may be enlarged such that a user may view finer details in the particular portion of the image. By zooming into the image, the user may be able to more clearly view a specific object of interest that is included within the image or a specific piece of information that is contained within the image.

In implementations, the image zoom regions may be areas within images that are relevant to a search query for which the images are returned as results, areas within images that are commonly zoomed into by other users or that are similar to areas within images that commonly zoomed into by other users, and/or areas within images that are frequently zoomed into by the user or that are similar to areas within images that are frequently zoomed into by the user. For example, if a user has previously zoomed into areas of images that include race cars, image zoom regions may be automatically determined based on areas of images that include race cars.

In an example, if a user searches for "Toy X", the user may be most interested in portions of images included in the search results that include Toy X. In implementations, image zoom regions that include Toy X may be automatically suggested since those portions of the images are most responsive to the "Toy X" search query. In another example, if a user searches for "toys", based on a particular user's previously indicated interest in Toy X (e.g., demonstrated by the particular user repeatedly zooming in on portions of images that include Toy X), implementations may automatically suggest image zoom regions that include Toy X when displaying images (e.g., as search results, or as a part of a collection of images that the user is browsing) for the particular user. In yet another example, if a particular user searches for "toys", based on a frequency of other users zooming into areas of images that include Toy X, implementations may automatically suggest image zoom regions that include Toy X.

By selecting a target associated with an image zoom region, a user may quickly zoom in on a particular area of an image that is of interest to a user, thereby improving user convenience, saving time, and reducing usage of power resources and/or other computational resource(s) of a client device as compared to when a user manually performs image zooming.

Implementations include a method and an associated interface for providing image zoom suggestions for images returned in response to a user query or for images included in a collection browsed by a user. These image zoom suggestions may be based on likely zoom areas (e.g., determined based on behavior of other users), may be implied by the search query, or may be based on learned preferences and interests from the user issuing the query. In implementations, image zooming suggestions may be shown as automatically suggested image zoom regions. The automatically suggested image zoom regions may be displayed as highlights, gleams, boxes, icons, or other graphical indications that are superimposed on top of certain parts of one or more images in a set of image search results or in an image collection being browsed by a user. In implementations, tapping on or clicking on an automatically suggested image zoom region may cause the zoom level of the associated image to be automatically adjusted (e.g., to a particular zoom level associated with the automatically suggested image zoom region) and the image may be automatically centered on the relevant zoom region. In implementations, the user may use zoom controls provided in a user interface to further adjust the zoom level of the image and/or navigate around the image to cause a different portion of the image to be displayed on the user interface.

In some implementations, image zoom suggestions may be provided when a user is browsing the user's own photos (e.g., a photo library that includes photos taken on the user's mobile phone). For example, automatically suggested image zoom regions may be determined based on an area within a given image that is frequently zoomed into by the user or that is similar to areas within other images that are frequently zoomed into by the user (e.g., areas that include family members of the user). The system may determine the suggested image zoom regions either server-side or locally on the user's device (e.g., as part of a photo viewer application) based on the user's historical browsing behavior.

In some implementations, the system may wait until a user selects an image (e.g., by tapping on or clicking on the image) before determining and/or providing indication(s) of one or more suggested image zoom regions (e.g., as highlights, gleams, boxes, icons, or other graphical indications that are superimposed on the image).

In various implementations, a method implemented by one or more processors may include receiving a search query; performing a search using the search query to identify search results that include image search results including a plurality of images that are responsive to the search query; for a given image of the plurality of images included in the image search results, determining at least one zoom region in the given image; and providing the search results including the image search results, including providing the given image and an indication of the at least one zoom region in the given image.

In some implementations, the search query is an image search query and the search results only include the image search results. In some implementations, the method further includes, for another image of the plurality of images included in the image search results, determining not to provide an indication of a zoom region. In some implementations, providing the indication of the at least one zoom region in the given image includes, for each of the at least one zoom region in the given image, providing a graphical indication of a position of the zoom region within the given image.

In some implementations, the determining the at least one zoom region includes, for each of the at least one zoom region, determining: a position of the zoom region, and a zoom level of the zoom region or a bounding box of the zoom region, and the method further includes receiving user interface input that indicates a selected zoom region in the given image; and in response to receiving the user interface input, adjusting a zoom level of the given image to display a view of the given image that is zoomed in at the zoom level of the selected zoom region or based on the bounding box of the selected zoom region, the zoomed-in view being centered on the position of the selected zoom region within the given image. In some implementations, the determining the at least one zoom region includes, for each of the at least one zoom region, determining a position of the zoom region by retrieving metadata associated with the given image that indicates the position of the zoom region in the given image. In some implementations, the metadata includes a mapping between search queries and regions in the given image or a mapping between semantic representations of search queries and regions in the given image.

In some implementations, the at least one zoom region in the given image includes a zoom region that is associated with the search query. In some implementations, the at least one zoom region in the given image is associated with the search query based on historical data that reflects prior zooms on the given image for past instances of the given image being returned in response to the search query or a related search query.

In some implementations, the at least one zoom region in the given image is associated with the search query further based on historical data for one or more other queries having at least a threshold degree of similarity to the search query. In some implementations, determining the at least one zoom region in the given image includes determining a position of a zoom region that is associated with the search query but not determining a position of another zoom region that is associated with another search query.

In some implementations, the at least one zoom region in the given image includes a zoom region that is unrelated to the search query. In some implementations, the at least one zoom region in the given image includes a zoom region that is associated with a preference of a user.

In some additional or alternative implementations, a computer program product may include one or more computer-readable storage media having program instructions collectively stored on the one or more computer-readable storage media. The program instructions may be executable to: receive a search query; perform a search using the search query to identify search results that include image search results including a plurality of images that are responsive to the search query; provide the search results including the image search results, including each of the plurality of images that are responsive to the search query; receive user interface input that indicates a selected image of the plurality of images that are responsive to the search query; determine a location of at least one zoom region in the selected image; and provide an indication of the location of each of the at least one zoom region in the selected image.

In some implementations, providing the indication of the location of each of at least one zoom region in the selected image includes, for each of the at least one zoom region in the selected image, providing a graphical indication of the location of the zoom region within the selected image. In some implementations, the program instructions are further executable to: receive user interface input that indicates a selected zoom region in the selected image; and in response to receiving the user interface input, adjusting a zoom level of the selected image to display a zoomed-in view of the selected image, the zoomed-in view being centered on the location of the selected zoom region within the selected image. In some implementations, determining the location of the at least one zoom region in the selected image includes retrieving metadata associated with the selected image that indicates the location of the at least one zoom region in the selected image.

In some additional or alternative implementations, a system may include a processor, a computer-readable memory, one or more computer-readable storage media, and program instructions collectively stored on the one or more computer-readable storage media. The program instructions may be executable to: receive a search query; perform a search using the search query to identify search results that include image search results including a plurality of images that are responsive to the search query; for a given image of the plurality of images included in the image search results, determine a location of a zoom region in the given image; and provide the search results including the image search results, including, for the given image, provide the given image with a zoom level adjusted to display a zoomed-in view of the given image, the zoomed-in view being centered on the location of the zoom region within the given image.

In some implementations, the program instructions are further executable to: provide an indication that the given image is zoomed in; and provide a user interface element to adjust the zoom level of the given image. In some implementations, the program instructions are further executable to determine a confidence level associated with the zoom region; and the zoom level is adjusted to display the zoomed-in view of the given image in response to the confidence level associated within the zoom region satisfying a confidence level threshold.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include a client device that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
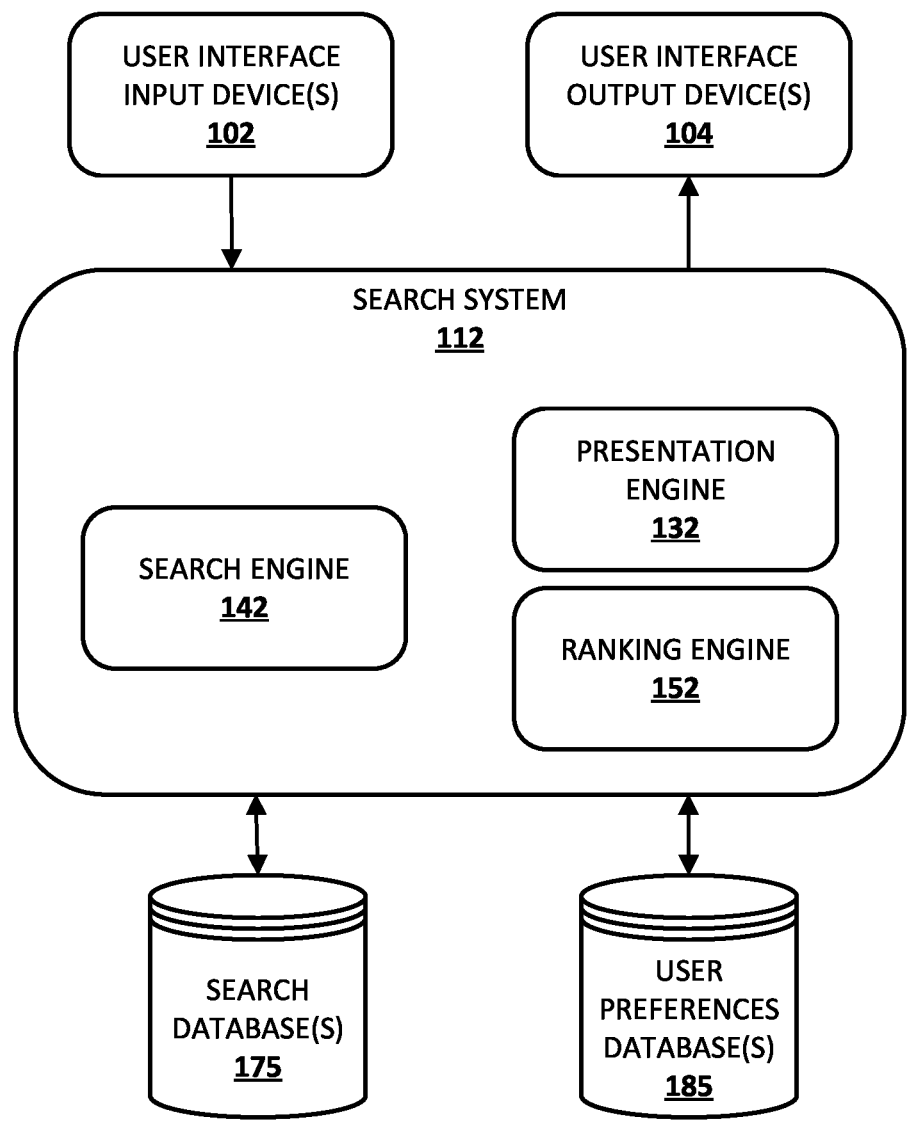
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a user intent prediction system 110, may be implemented using one or more server computing devices that form what is sometimes referred to as a "cloud infrastructure," although this is not required.

In implementations, the example environment 100 includes one or more user interface input devices 102, one or more user interface output devices 104, and a search system 112. Although search system 112 is illustrated in FIG. 1 as separate from the user interface input and output devices 102, 104, in some implementations all or aspects of the search system 112 may be implemented on a computing device that also contains the user interface input device(s) 102 and/or the user interface output device(s) 104. For example, all or aspects of a presentation engine 132 of search system 112 may be implemented on the computing device. In some implementations, all or aspects of the search system 112 may be implemented on computing device(s) that are separate and remote from a computing device that contains the user interface input devices 102 and/or the user interface output devices 104 (e.g., all or aspects may be implemented "in the cloud"). In some of those implementations, those aspects of search system 112 may communicate with the computing device via one or more networks such as a local area network (LAN) and/or wide area network (WAN) (e.g., the Internet). In some implementations, one or more aspects of search system 112 and user interface input/output devices 102, 104 may be implemented or assisted by a virtual assistant or a component of the virtual assistant.

The user interface input devices 102 may include, for example, a physical keyboard, a touch screen, a vision sensor such as a digital camera, an accelerometer (e.g., to capture gestures), a fingerprint sensor, a radar sensor (e.g., to visibly detect gestures), and/or a microphone, to name a few. The user interface output devices 104 may include, for example, a display screen, a haptic feedback device, and/or speaker(s). The user interface input and output devices 102, 104 may be incorporated on one or more computing devices of a user. For example, a mobile phone of the user may include the user interface input and output devices 102, 104; or a standalone personal virtual assistant hardware device may include the user interface input and output devices 102, 104; or a first computing device may include the user interface input device(s) 102 and a separate computing device may include the user interface output device(s) 104; etc. A "standalone personal virtual assistant hardware device" may be a device that is designed primarily or exclusively to allow a user to interact with a virtual assistant using free-form natural language input. These may take various forms, such as standalone "smart" speakers, smart displays, etc.

As illustrated in FIG. 1, a user provides a search query to the search system 112 via the user interface input device(s) 102. The search system 112 provides responsive output for presentation to the user via the user interface output devices(s) 104. Each search query is a request for information. The search query can be, for example, in a text form and/or in other forms such as, for example, audio form and/or image form. For example, in some implementations, the user interface input device(s) 102 may include a keyboard that generates textual input in response to user interface input directed to the keyboard. Also, for example, in some implementations, user interface input device(s) 102 may include a microphone. In some such cases, a speech recognition module that is local to search system 112 or with which search system 112 may communicate may convert audio speech input received at the microphone into textual input. Subsequently, the textual input may be provided to search system 112. For brevity, the input is illustrated in FIG. 1 as being provided directly to the search system 112 by the user interface input device(s) 102 and the output is illustrated as being provided by the search system 112 directly to the user interface output device(s) 104. However, it is noted that in various implementations one or more intermediary software and/or hardware components may be functionally interposed between the search system 112 and the user interface input and/or output devices 102, 104, and may optionally process the input and/or output. Thus, in some implementations, a user may communicate with all or aspects of search system 112 utilizing a plurality of client computing devices that collectively form a coordinated "ecosystem" of computing devices.

The search system 112 may additionally include a search engine 142, a ranking engine 152, and a presentation engine 132. In some implementations, one or more of engines 142, 152, and/or 132 may be omitted, combined, and/or implemented in a component that is separate from search system 112. For example, one or more of engines 142, 152, and/or 132 or any operative portion thereof, may be implemented in a component that is executed by a client computing device that includes the user interface input and/or output devices 102 and 104 and that is separate from the search system 112. Also, for example, the search engine 142 and/or the ranking engine 152 may be implemented in whole or in part by a system that is separate from the search system 112 (e.g., a separate search system in communication with the search system 112).

In some implementations, the search query provided to the search system 112 via the user interface input device(s) 102 is used by the search engine 142 during performance of a search of one or more search databases 175. In some implementations, once the search engine 142 generates the results of the search of the search databases 175 performed based on the search query, the results are provided to the ranking engine 152. The ranking engine 152 may rank the search results according to the relevance of the resources associated with the results to the search parameters of the search query.

In some implementations, the ranked search results are then provided to the presentation engine 132. The presentation engine 132 provides the ranked search results that are responsive to the search query to one or more user interface output devices 104 for presentation to the user in various output formats. In some implementations, the ranked search results may include one or more images. In other implementations, the search query provided to the search system 112 via the user interface input device(s) 102 may be an image search query, and the ranked search results may be a plurality of images returned in response to the image search query.

In some implementations, the presentation engine 132 will also provide, with the images that are provided to one or more user interface output devices 104, indications of one or more automatically suggested image zoom regions in one or more of the images included in the ranked search results. In some implementations, the indications may be visual indications such as highlights, gleams, boxes, icons, or other graphical indications that are superimposed on images included in the ranked search results when they are displayed on one or more user interface output devices 104. The visual indications may identify selectable targets in one or more of the images. In response to a selection of the target by a user (e.g., by tapping on the target or by clicking on the target) using the user interface input device(s) 102, the image may be automatically zoomed in on one of the user interface output devices 104 (e.g., a display), at a location in the image that is associated with the selectable target. In some implementations, a user may also manually manipulate a zoom level and/or scroll position within an image by accessing controls in a user interface, providing touch input, etc., using the user interface input device(s) 102, either subsequent to selecting a target or without having selected a target. In some implementations, information about a user selection of one or more automatically suggested image zoom regions and/or information about a manually selected zoom level and/or scroll position within one or more of the images may be provided to the search system 112.

In some implementations, the image zoom regions may be areas within images that are determined, by the search engine 142, to be relevant to the search query for which the images are returned as results.

In other implementations, the image zoom regions may be areas within images that are commonly zoomed into by other users, as identified by the search engine 142 using historical data in search database(s) 175. This information about areas within images that are commonly zoomed into that is stored in search database(s) 175 may be updated in response to receipt, from a plurality of users, of the information about the users' selections of one or more automatically suggested image zoom regions and/or the information about the manually selected zoom level and/or scroll position within one or more of the images. The search system 112 may anonymize and/or aggregate the information about the users' selections of one or more automatically suggested image zoom regions and/or the information about the manually selected zoom level and/or scroll position within one or more of the images, in order to preserve user privacy.

In other implementations, the image zoom regions may be areas within images that are frequently zoomed into by the user or that are similar to areas within images that are frequently zoomed into by the user, as identified by the search engine 142 using historical data in user preferences database(s) 185. This information about areas within images that are frequently zoomed into by the user that is stored in user preferences database(s) 185 may be updated in response to receipt of the information about the user selection of one or more automatically suggested image zoom regions and/or the information about the manually selected zoom level and/or scroll position within one or more of the images.

In some implementations, when the search system 112 performs image searches, the search system 112 records (logs) when/how image results are zoomed by users and for which queries and uses this information to train and refine offline models that are used to automatically suggest image zoom regions. In particular, for a given image, the search system 112 mines information about zooming behavior from logs generated from past searches for the same or similar queries to identify common zoom regions that are both query-specific and query-agnostic. Each exact zoom location and/or level may be slightly different, so the search system 112 may perform clustering and/or quantization to collapse a group of similar zooms from different users/sessions into one. The search system 112 may thus determine common zoom regions for the image in general (across different queries) as well as common zoom regions given a particular query (or cluster of queries). For example, any search which shows the particular image as a result where users have similar zooming behavior will indicate query-agnostic zooms.

In some implementations, the mining process described above is used to build a statistical model so that the search system 112 is able to identify, based on log data, common user behavior with respect to zooming, given a certain image and/or query. Alternatively or additionally, in some implementations, the mining process described above is used to train a machine learning model (e.g., a deep neural network) which is able to generalize common zooming behavior more broadly across different images. The model may be a variant of a convolutional neural network. In particular, the model may be an object localization model such as a single-shot detector (SSD), recurrent convolutional neural network (RCNN), etc. The input to the model may be an image and the output may be a set of potential bounding boxes. In some implementations, the machine learning model may be multimodal and may take a side input of a query which is used to bias the results towards what the user explicitly mentioned as part of their textual request. The query parameter to the model may be optional. If the query parameter is not specified, the model may fall back on suggesting general regions of interest that are not query specific.

In some implementations, a combination of a statistical model and a neural network may be used to determine suggested zoom regions. In some implementations, the system uses previously observed behavior for specific queries, while generalizing more broadly across images.

In some implementations, for each set of search results that includes images, zoom regions may be identified and displayed to the user. The search system 112 may identify query-independent zoom regions offline as a static process, as associated metadata for each image. The search system 112 may look up the query-specific zoom regions and/or compute the query-specific zoom regions online at query time, once the system has the query for each candidate image.

In some implementations, image search results that have smaller dimensions or that are cropped versions of larger images may be used by the search system 112 as a source of learning. For example, if users typically tap on or click on a smaller-dimensioned image next to the larger image, that is indicative of a preference based on the query and the user.

In some implementations, the image zoom regions may also be personalized based on the user's interests. For example, the search system 112 may determine based on a user's profile stored in user preferences database(s) 185 that the user is interested in race cars. The search system 112 may also infer this user interest based on the user's previous image zooming history and/or other signals such as web searches, video views, purchase history, travel history, etc. In this setting, the search system 112 may learn a separate or extended model that allows the search system 112 to condition a convolutional neural network used to determine the suggested zoom regions on such preferences which are provided as another side input. In other implementations, the search system 112 may use a generic model which emits bounding boxes and associated classes. The search system 112 may intersect the output of the generic model with the user's interests. For example, if one of the bounding boxes emitted by the generic model is a bounding box of a race car, then the search system 112 may select that bounding box of the race car as a suggested image zoom region to provide to the user, based on the user's profile stored in user preferences database(s) 185 that identifies the user's interest in race cars.

Figure 2:
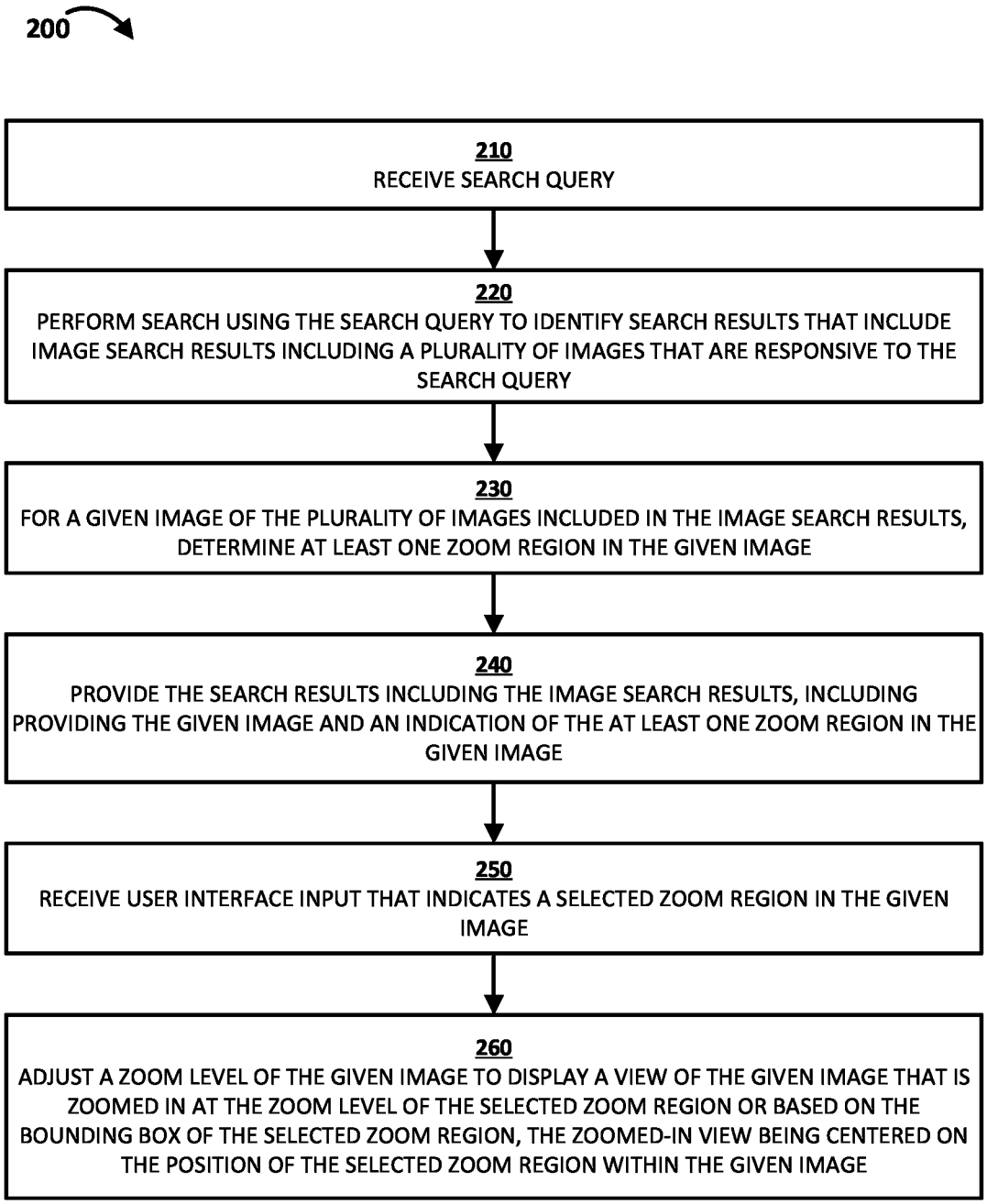
FIG. 2, FIG. 3, and FIG. 4 depict flowcharts illustrating example methods of automatically suggesting image zoom regions, in accordance with various implementations.

FIG. 2 depicts a flowchart illustrating an example method 200 of automatically suggesting image zoom regions. For convenience, the operations of the method 200 are described with reference to a system that performs the operations. This system of method 200 includes one or more processors and/or other component(s) of various computer systems. Moreover, while operations of method 200 are shown in a particular order, this is not meant to be limiting. One or more operations may be reordered, omitted, or added.

At block 210, the system receives a search query. In some implementations, a search application or a search web page rendered by a web browser may be displayed on one or more of the user interface output devices 104. The user may use one or more of the user interface input devices 102 to input the search query, which may be transmitted to the search system 112. The search query may be a text query, an image query, or any other type of search query.

At block 220, the system performs a search using the search query to identify search results that include image search results including a plurality of images that are responsive to the search query. In some implementations, the search engine 142 of the search system 112 uses the search query received at block 210 by the search system 112 to perform the search of one or more search databases 175. As results of the search, the search engine 142 identifies search results that include image search results including a plurality of images that are responsive to the search query. In some implementations, the search query received at block 210 is an image search query and the search results only include the image search results. In other implementations, the search results include images as well as other types of search results (e.g., web pages, text, etc.).

At block 230, for a given image of the plurality of images included in the image search results, the system determines at least one zoom region in the given image. In some implementations, the search engine 142 provides the search results identified at block 220 to the ranking engine 152, which may rank the search results according to the relevance of the resources associated with the results to the search parameters of the search query. In some implementations, the ranking engine 152 then provides the ranked search results to the presentation engine 132. In some implementations, the search engine 142, ranking engine 152, and/or the presentation engine 132 determines at least one zoom region in the given image.

Still referring to block 230, in some implementations, the determining at least one zoom region includes, for each of at least one zoom region, determining a position of the zoom region and determining a zoom level of the zoom region or a bounding box of the zoom region.

Still referring to block 230, in some implementations, the determining the at least one zoom region includes, for each of the at least one zoom region, determining a position of the zoom region by retrieving metadata associated with the given image that indicates the position of the zoom region in the given image. In some implementations, the metadata includes a mapping between search queries and regions in the given image or a mapping between semantic representations of search queries and regions in the given image.

Still referring to block 230, in some implementations, the at least one zoom region in the given image includes a zoom region that is associated with the search query. In some implementations, the at least one zoom region in the given image is associated with the search query based on historical data that reflects prior zooms on the given image for past instances of the given image being returned in response to the search query or a related search query. For example, the related search query may be a search query that is similar to or equivalent to the search query received at block 210. In other implementations, the at least one zoom region in the given image is associated with the search query further based on historical data for one or more other queries having at least a threshold degree of similarity to the search query. The historical data may be stored in search database(s) 175 or any other location. In some implementations, determining the at least one zoom region in the given image includes determining a position of a zoom region that is associated with the search query but not determining a position of another zoom region that is associated with another search query.

Still referring to block 230, in some implementations, the at least one zoom region in the given image includes a zoom region that is unrelated to the search query. In some implementations, the at least one zoom region in the given image includes a zoom region that is associated with a preference of a user. For example, the image zoom region may be an area within the given image that is frequently zoomed into by the user or that is similar to areas within other images that are frequently zoomed into by the user (e.g., areas that include family members of the user), as identified by the search engine 142 using historical data in user preferences database(s) 185.

Still referring to block 230, in some implementations, the search system 112 uses a statistical model, a neural network, or a combination of a statistical model and a neural network to determine suggested image zoom regions. In some implementations, the system uses previously observed behavior for specific queries, while generalizing more broadly across images.

Still referring to block 230, in some implementations, for another image of the plurality of images included in the image search results, the system determines not to provide an indication of a zoom region.

At block 240, the system provides the search results including the image search results, including providing the given image and an indication of the at least one zoom region in the given image. In some implementations, the presentation engine 132 provides the search results including the image search results identified at block 220 and the indication of the at least one zoom region in the given image determined at block 230 to one or more user interface output devices 104 for presentation to the user in various output formats. For example, the search results may be displayed within a search application or a search web page rendered by a web browser.

Still referring to block 240, in some implementations, the providing the indication of the at least one zoom region in the given image includes, for each of the at least one zoom region in the given image, providing a graphical indication of a position of the zoom region within the given image. In some implementations, the graphical indication may be a visual indication such as a highlight, gleam, box, icon, etc. that is superimposed on the given image when the given image is displayed on one or more user interface output devices 104.

At block 250, the system receives user interface input that indicates a selected zoom region in the given image. In some implementations, the user interface input is provided via the user interface input device(s) 102. For example, a user may tap or click on an indication of a position of a zoom region (e.g., a highlight, gleam, box, icon, etc.) in the given image, provided at block 240.

At block 260, in response to receiving the user interface input at block 250, the system adjusts a zoom level of the given image to display a view of the given image that is zoomed in at the zoom level of the selected zoom region or based on the bounding box of the selected zoom region, the zoomed-in view being centered on the position of the selected zoom region within the given image. In some implementations, the zoom level and position of the given image that is displayed on one or more user interface output devices 104 is automatically adjusted based on a zoom level and position associated with the zoom region selected at block 250.

Still referring to block 260, in some implementations, after the zoom level and position are adjusted (e.g., by zooming in on the bounding box), the system may emphasize a particular object in the bounding box and/or crop a particular object in the bounding box from the larger image. In some implementations, this is done by highlighting the particular object and/or by preserving the particular object but applying a level of transparency to a surrounding area in the image. For example, if the bounding box surrounds a bird that appears in an image that depicts a landscape, the system may emphasize a heatmap corresponding to the bird (e.g., highlighting the bird object in contrast to the background) or may perform a "soft" crop of the bird from the surrounding image by applying transparency to the area surrounding the bird.

In other implementations, the operations of the method 200 may be performed with respect to a video, which the system may treat as a collection of images. For example, the system may preprocess a video to identify and/or extract 10 key frames which may be indexed and processed according to the operations of method 200. These key frames may be included in the search results at block 220, and the system may determine zoom regions in the key frames at block 230. The videos and/or the key frames from the videos may be included in the image search results at block 240 and may be selected at block 250, and the zoom level either of the a key frame image or of the video as a whole may be adjusted at block 260.

Figure 3:
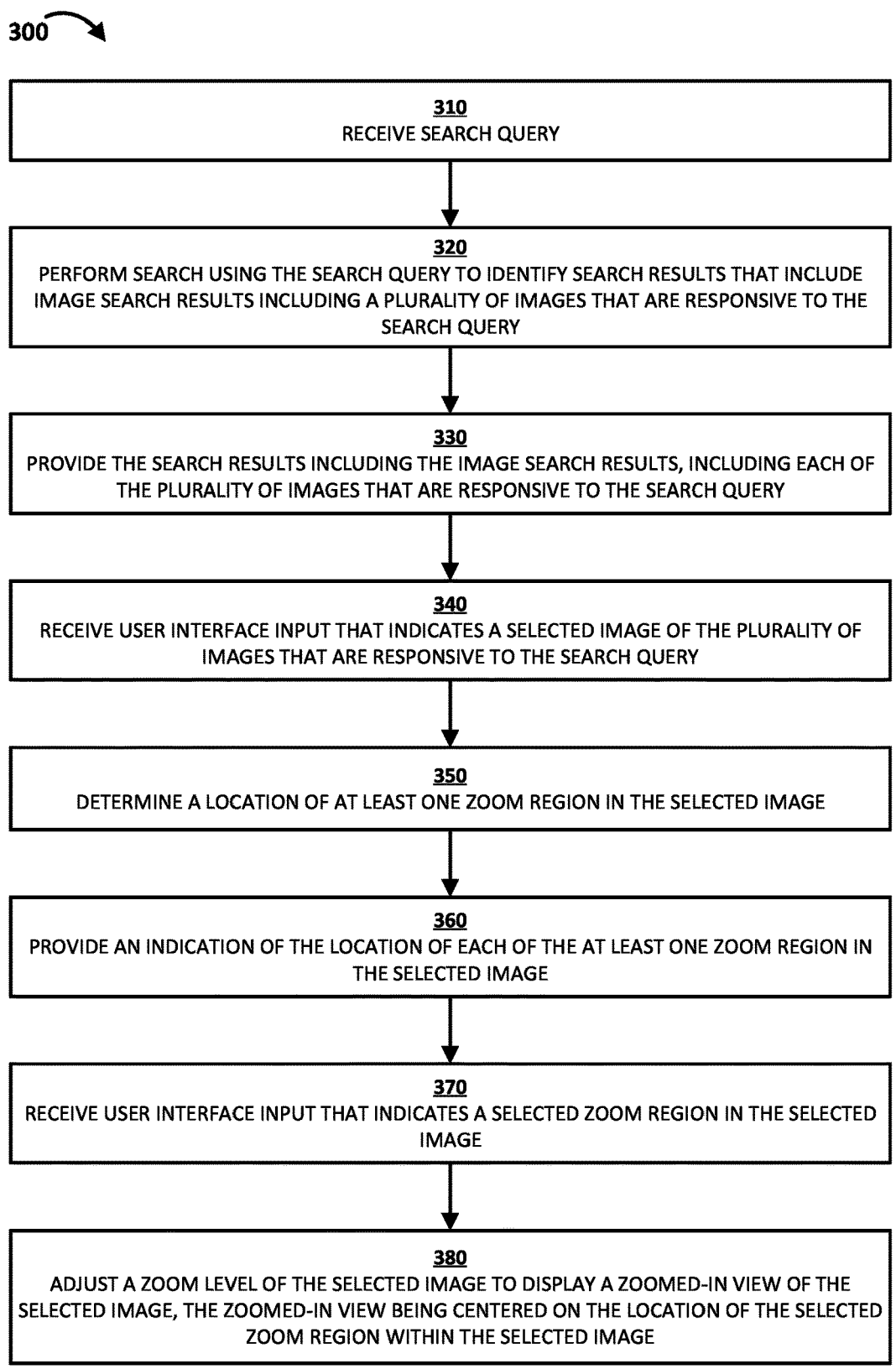

FIG. 3 depicts a flowchart illustrating an example method 300 of automatically suggesting image zoom regions. For convenience, the operations of the method 300 are described with reference to a system that performs the operations. This system of method 300 includes one or more processors and/or other component(s) of various computer systems. Moreover, while operations of method 300 are shown in a particular order, this is not meant to be limiting. One or more operations may be reordered, omitted, or added.

At block 310, the system receives a search query. In some implementations, a search application or a search web page rendered by a web browser may be displayed on one or more of the user interface output devices 104. The user may use one or more of the user interface input devices 102 to input the search query, which may be transmitted to the search system 112. The search query may be a text query, an image query, or any other type of search query.

At block 320, the system performs a search using the search query to identify search results that include image search results including a plurality of images that are responsive to the search query. In some implementations, the search engine 142 of the search system 112 uses the search query received at block 310 by the search system 112 to perform the search of one or more search databases 175. As results of the search, the search engine 142 identifies search results that include image search results including a plurality of images that are responsive to the search query. In some implementations, the search query received at block 310 is an image search query and the search results only include the image search results. In other implementations, the search results include images as well as other types of search results (e.g., web pages, text, etc.).

At block 330, the system provides the search results including the image search results, including each of the plurality of images that are responsive to the search query. In some implementations, the presentation engine 132 provides the search results including the image search results identified at block 320 to one or more user interface output devices 104 for presentation to the user in various output formats. For example, the search results may be displayed within a search application or a search web page rendered by a web browser.

At block 340, the system receives user interface input that indicates a selected image of the plurality of images that are responsive to the search query. In some implementations, the user interface input is provided via the user interface input device(s) 102 to the search system 112. For example, a user may scroll through the plurality of images provided at block 330 and then tap on or click on the selected image.

At block 350, the system determines a location of at least one zoom region in the selected image. In some implementations, in response to receiving the user input at block 340, the search engine 142, ranking engine 152, and/or the presentation engine 132 of the search system 112 determines the location of at least one zoom region in the image selected at block 340. In some implementations, determining the location of the at least one zoom region in the selected image includes retrieving metadata associated with the selected image that indicates the location of the at least one zoom region in the selected image. In some implementations, the metadata includes a mapping between search queries and regions in the selected image or a mapping between semantic representations of search queries and regions in the selected image.

Still referring to block 350, in some implementations, the at least one zoom region in the selected image includes a zoom region that is associated with the search query. In some implementations, the at least one zoom region in the selected image is associated with the search query based on historical data that reflects prior zooms on the selected image for past instances of the given image being returned in response to the search query. In other implementations, the at least one zoom region in the selected image is associated with the search query further based on historical data for one or more other queries having at least a threshold degree of similarity to the search query. The historical data may be stored in search database(s) 175 or any other location. In some implementations, determining the location of the at least one zoom region in the selected image includes determining a location of a zoom region that is associated with the search query but not determining a location of another zoom region that is associated with another search query.

Still referring to block 350, in some implementations, the at least one zoom region in the selected image includes a zoom region that is unrelated to the search query. In some implementations, the at least one zoom region in the selected image includes a zoom region that is associated with a preference of a user. For example, the image zoom region may be an area within the selected image that is frequently zoomed into by the user or that is similar to areas within other images that are frequently zoomed into by the user (e.g., areas that include family members of the user), as identified by the search engine 142 using historical data in user preferences database(s) 185.

Still referring to block 350, in some implementations, the search system 112 uses a statistical model, a neural network, or a combination of a statistical model and a neural network to determine suggested image zoom regions. In some implementations, the system uses previously observed behavior for specific queries, while generalizing more broadly across images.

At block 360, the system provides an indication of the location of each of the at least one zoom region in the selected image. In some implementations, the presentation engine 132 provides the indication of the location of the at least one zoom region in the selected image determined at block 350 to one or more user interface output devices 104 for presentation to the user, e.g., within the search application or the search web page rendered by the web browser.

Still referring to block 360, in some implementations, the providing the indication of the location of the at least one zoom region in the selected image includes, for each of the at least one zoom region in the selected image, providing a graphical indication of the location of the zoom region within the selected image. In some implementations, the graphical indication may be a visual indication such as a highlight, gleam, box, icon, etc. that is superimposed on the selected image when the given image is displayed on one or more user interface output devices 104.

At block 370, the system receives user interface input that indicates a selected zoom region in the selected image. In some implementations, the user interface input is provided via the user interface input device(s) 102. For example, a user may tap on or click on an indication of a location of a zoom region (e.g., a highlight, gleam, box, icon, etc.) in the selected image, provided at block 360.

At block 380, in response to receiving the user interface input at block 370, the system adjusts a zoom level of the selected image to display a zoomed-in view of the selected image, the zoomed-in view being centered on the location of the selected zoom region within the selected image. In some implementations, the zoom level and position of the selected image that is displayed on one or more user interface output devices 104 is automatically adjusted based on a zoom level and zoom location associated with the zoom region selected at block 370.

Figure 4:
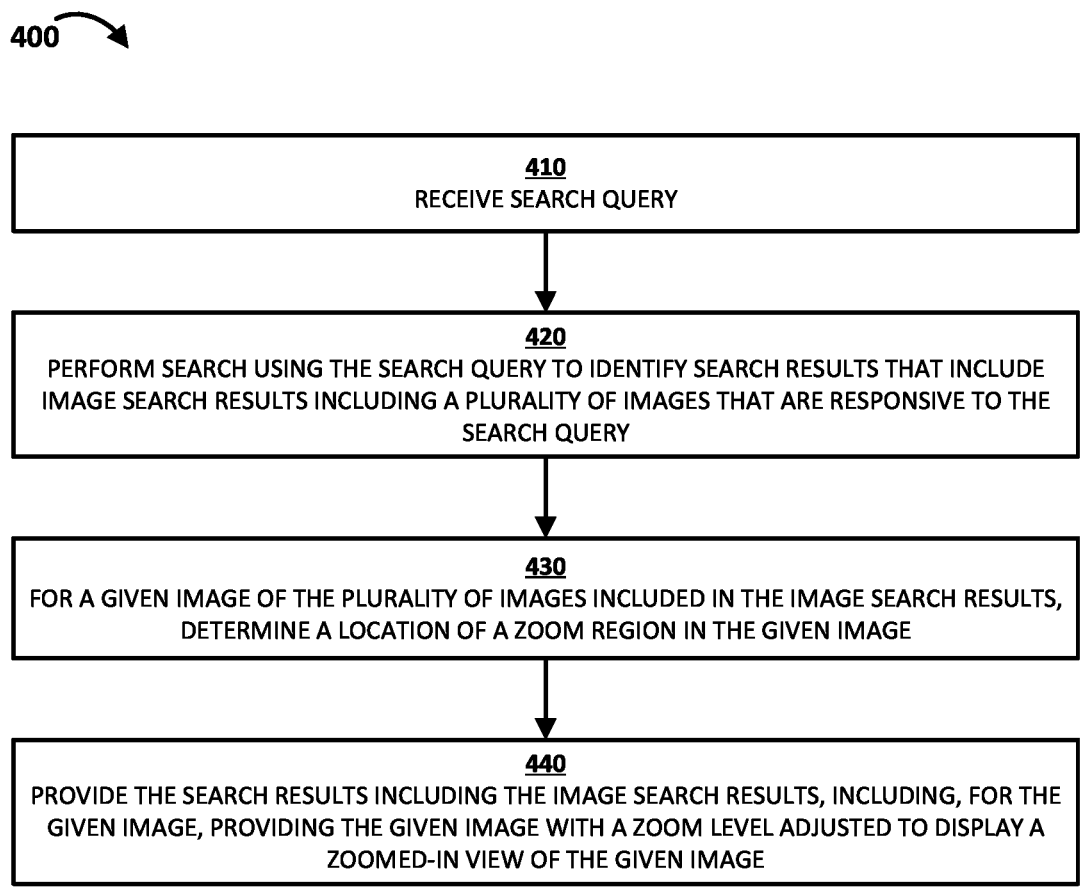

FIG. 4 depicts a flowchart illustrating an example method 400 of automatically suggesting image zoom regions. For convenience, the operations of the method 400 are described with reference to a system that performs the operations. This system of method 400 includes one or more processors and/or other component(s) of various computer systems. Moreover, while operations of method 400 are shown in a particular order, this is not meant to be limiting. One or more operations may be reordered, omitted, or added.

At block 410, the system receives a search query. In some implementations, a search application or a search web page rendered by a web browser may be displayed on one or more of the user interface output devices 104. The user may use one or more of the user interface input devices 102 to input the search query, which may be transmitted to the search system 112. The search query may be a text query, an image query, or any other type of search query.

At block 420, the system performs a search using the search query to identify search results that include image search results including a plurality of images that are responsive to the search query. In some implementations, the search engine 142 of the search system 112 uses the search query received at block 410 by the search system 112 to perform the search of one or more search databases 175. As results of the search, the search engine 142 identifies search results that include image search results including a plurality of images that are responsive to the search query. In some implementations, the search query received at block 410 is an image search query and the search results only include the image search results. In other implementations, the search results include images as well as other types of search results (e.g., web pages, text, etc.).

At block 430, for a given image of the plurality of images included in the image search results, the system determines a location of a zoom region in the given image. In some implementations, the search engine 142 provides the search results identified at block 420 to the ranking engine 152, which may rank the search results according to the relevance of the resources associated with the results to the search parameters of the search query. In some implementations, the ranking engine 152 then provides the ranked search results to the presentation engine 132. In some implementations, the search engine 142, ranking engine 152, and/or the presentation engine 132 determines the location of a zoom region in the given image.

Still referring to block 430, in some implementations, determining the location of the zoom region in the given image includes retrieving metadata associated with the given image that indicates the location of the zoom region in the given image. In some implementations, the metadata includes a mapping between search queries and regions in the given image or a mapping between semantic representations of search queries and regions in the given image.

Still referring to block 430, in some implementations, the zoom region in the given image includes a zoom region that is associated with the search query. In some implementations, the zoom region in the given image is associated with the search query based on historical data that reflects prior zooms on the given image for past instances of the given image being returned in response to the search query or a related search query. For example, the related search query may be a search query that is similar to or equivalent to the search query received at block 410. In other implementations, the zoom region in the given image is associated with the search query further based on historical data for one or more other queries having at least a threshold degree of similarity to the search query. The historical data may be stored in search database(s) 175 or any other location. In some implementations, the determining the location of the zoom region in the given image includes determining a location of a zoom region that is associated with the search query but not determining a location of another zoom region that is associated with another search query.

Still referring to block 430, in some implementations, the zoom region in the given image includes a zoom region that is unrelated to the search query. In some implementations, the zoom region in the given image includes a zoom region that is associated with a preference of a user. For example, the zoom region may be an area within the given image that is frequently zoomed into by the user or that is similar to areas within other images that are frequently zoomed into by the user (e.g., areas that include family members of the user), as identified by the search engine 142 using historical data in user preferences database(s) 185.

Still referring to block 430, in some implementations, the search system 112 uses a statistical model, a neural network, or a combination of a statistical model and a neural network to determine the zoom region. In some implementations, the system uses previously observed behavior for specific queries, while generalizing more broadly across images.

At block 440, the system provides the search results including the image search results, including, for the given image, providing the given image with a zoom level adjusted to display a zoomed-in view of the given image, the zoomed-in view being centered on the location of the zoom region within the given image determined at block 430. In some implementations, the presentation engine 132 provides the search results including the image search results identified at block 420 and the given image with a zoom level automatically adjusted to display a zoomed-in view of the given image to one or more user interface output devices 104 for presentation to the user in various output formats. For example, the search results may be displayed within a search application or a search web page rendered by a web browser. In some implementations, the zoom level of the given image is automatically adjusted without requiring a user to first select the zoom region in the given image.

Still referring to block 440, in some implementations, the system provides an indication that the given image is zoomed in and provides a user interface element to adjust the zoom level of the given image. The indication may be a graphical element (e.g., an icon) that is displayed in the user interface or any other visual indication.

Still referring to block 440, in some implementations, the system determines a confidence level associated with the zoom region. The confidence level may be based upon, for example, historical data that reflects prior zooms on the given image in the zoom region in connection with the search query received at block 410 and/or similar search queries. In some implementations, the confidence level may be determined based on output of a statistical model and/or a neural network. In some implementations, the system adjusts the zoom level to display the zoomed-in view of the given image in response to the confidence level associated within the zoom region satisfying a confidence level threshold.

Figure 5A:
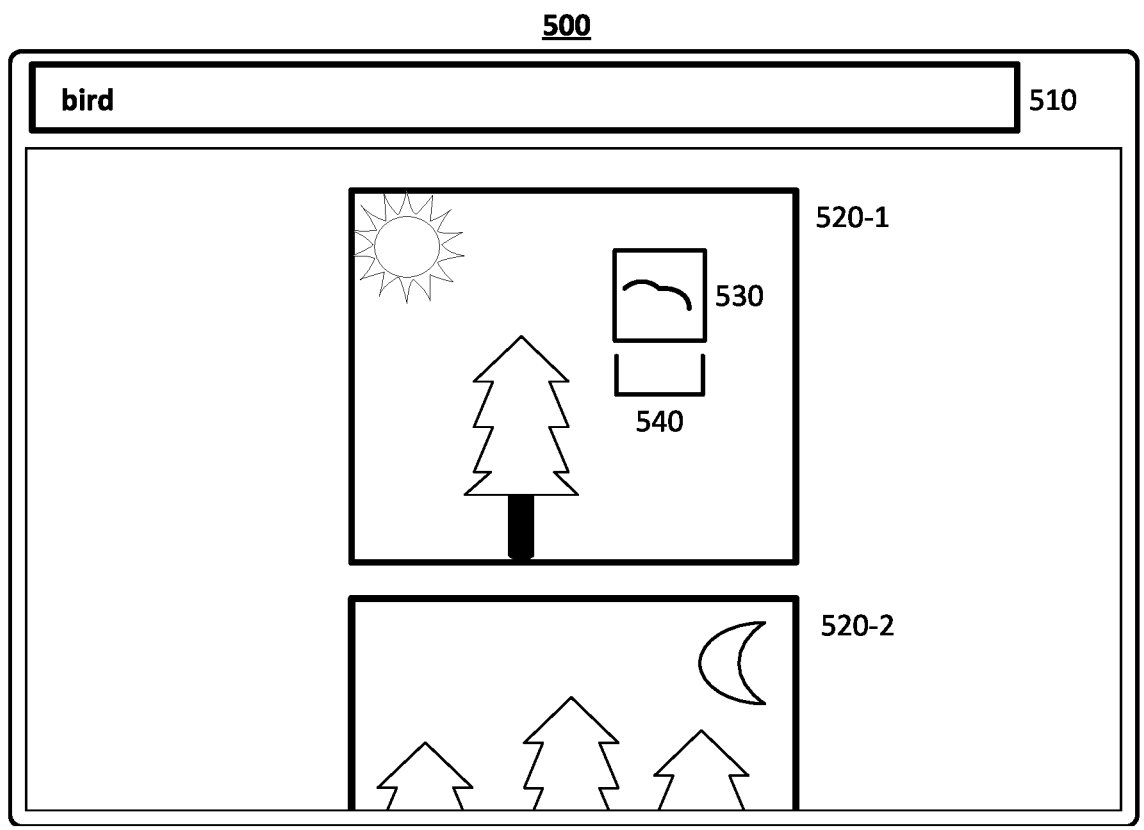
FIG. 5A and FIG. 5B depict an example application of techniques described herein, in accordance with various implementations.
Figure 5B:
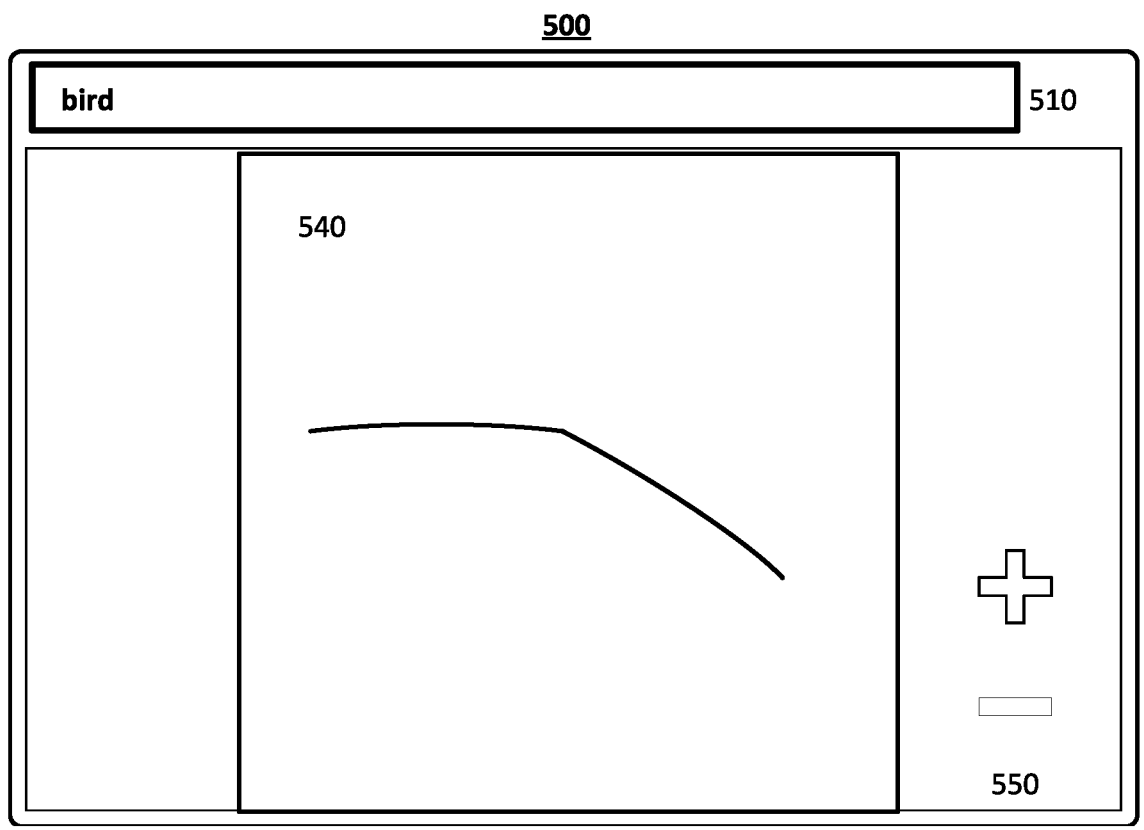

FIGS. 5A and 5B depict an example of how image zoom regions and zoomed-in images may be displayed on the user interface output device(s) 104 (e.g., by a search application or by a web browser). The scenario of FIGS. 5A and 5B is for illustrative purposes only. In FIGS. 5A and 5B, user interface output device(s) 104 display a webpage 500. As illustrated in FIG. 5A, the webpage 500 incudes a search box 510 in which a user has provided a search query, "bird", and search result images 520-1, 520-2, which are provided by the search system 112 in response to the search query. Search result image 520-1 includes an indication 530 of the location of an image zoom region 540. In response to receiving user interface input via the user interface input device(s) 102 (e.g., the user taps or clicks the image zoom region 540), a zoom level of the search result image 520-1 is adjusted to display a zoomed-in view of the portion of the search result image 520-1 that is the zoom region 540, as illustrated in FIG. 5B. Zoom controls 550 may be used by the user to further adjust the zoom level.

Figure 6:
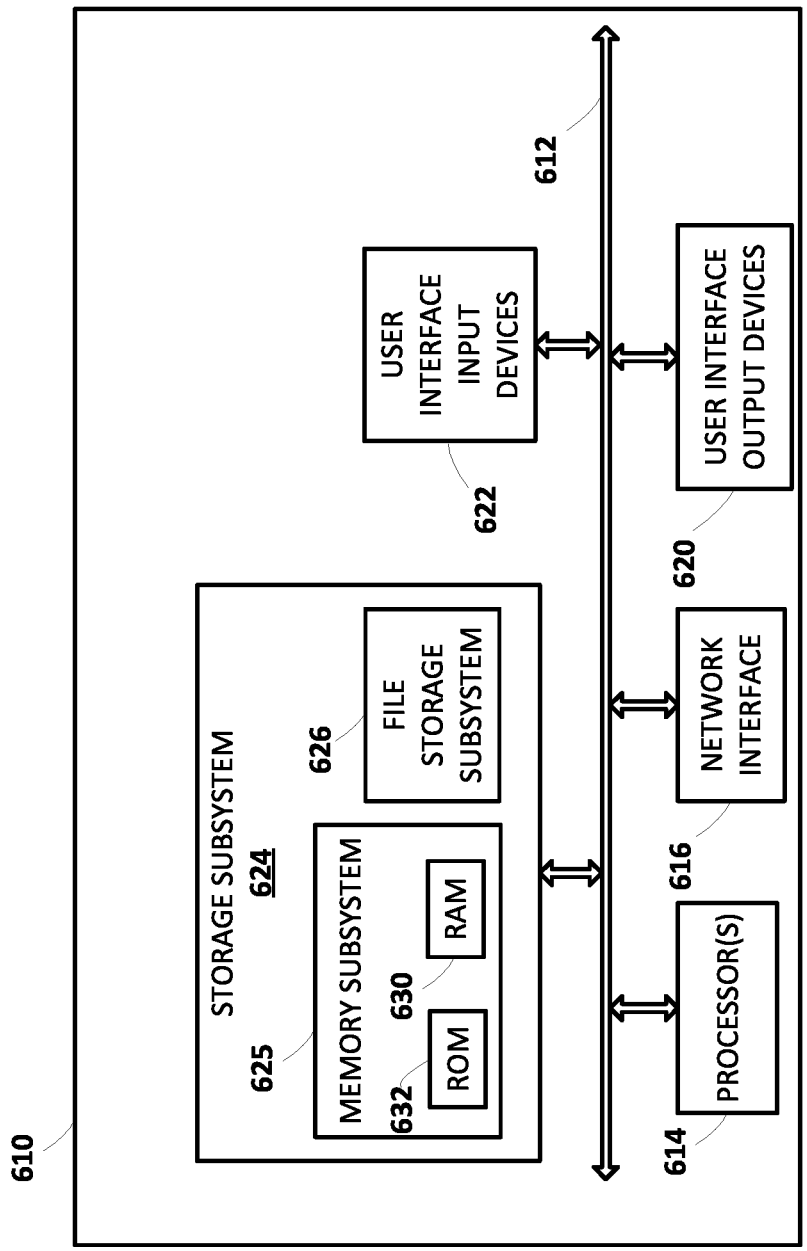
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods of FIGS. 2, 3, and 4, as well as to implement various components depicted in FIG. 1.

These software modules are generally executed by processor 614 alone or in combination with other processors. The memory subsystem 625 included in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    receiving a search query;
    performing a search using the search query to identify search results that include image search results comprising a plurality of images that are responsive to the search query;
    for a given image of the plurality of images included in the image search results, determining, based on the search query, at least one zoom region in the given image, each of the at least one zoom region corresponding to a particular position in the given image and being selectable to cause a view of the given image to be automatically zoomed in such that the particular position in the given image is centered and enlarged in the view; and
    providing the search results including the image search results, including providing the given image and, for each of the at least one zoom region in the given image, providing a graphical indication of the particular position of the zoom region within the given image, the graphical indication being superimposed on the given image to indicate the particular position of the zoom region.

2. The method according to claim 1, wherein the search query is an image search query and the search results only include the image search results.

3. The method according to claim 1, further comprising, for another image of the plurality of images included in the image search results, determining not to provide an indication of a zoom region.

4. The method according to claim 1, wherein the determining the at least one zoom region comprises, for each of the at least one zoom region, determining:
    the particular position of the zoom region, and
    a zoom level of the zoom region or a bounding box of the zoom region, and
    further comprising:
    receiving user interface input that indicates a selected zoom region in the given image a selected zoom region in the given image; and
    in response to receiving the user interface input, adjusting a zoom level of the given image to display the view of the given image that is zoomed in at the zoom level of the selected zoom region or based on the bounding box of the selected zoom region, the particular position of the selected zoom region within the given image being centered and enlarged in the zoomed-in view.

5. The method according to claim 1, wherein the determining the at least one zoom region comprises, for each of the at least one zoom region, determining the particular position of the zoom region by retrieving metadata associated with the given image that indicates the particular position of the zoom region in the given image.

6. The method according to claim 5, wherein the metadata includes a mapping between search queries and regions in the given image or a mapping between semantic representations of search queries and regions in the given image.

7. The method according to claim 1, wherein the at least one zoom region in the given image comprises a zoom region that is associated with the search query.

8. The method according to claim 7, wherein the at least one zoom region in the given image is associated with the search query based on historical data that reflects prior zooms on the given image for past instances of the given image being returned in response to the search query or a related search query.

9. The method according to claim 8, wherein the at least one zoom region in the given image is associated with the search query further based on historical data for one or more other queries having at least a threshold degree of similarity to the search query.

10. The method according to claim 1, wherein the determining the at least one zoom region in the given image includes determining a position of a zoom region that is associated with the search query but not determining a position of another zoom region that is associated with another search query.

11. The method according to claim 1, wherein the at least one zoom region in the given image comprises a zoom region that is unrelated to the search query.

12. The method according to claim 1, wherein the at least one zoom region in the given image comprises a zoom region that is associated with a preference of a user.

13. The method according to claim 1, wherein the graphical indication is a highlight, a gleam, a box, or an icon that is superimposed on the given image.

14. The method according to claim 13, wherein, for each of the at least one zoom region in the given image:
the graphical indication associated with the zoom region is a selectable target; and
in response to receiving user interface input that indicates a tap or a click on the selectable target, the given image is automatically zoomed in such that the zoom region is centered and enlarged in the view.

15. A computer program product comprising one or more non-transitory computer-readable storage media having program instructions collectively stored on the one or more non-transitory computer-readable storage media, the program instructions executable to:
receive a search query;
perform a search using the search query to identify search results that include image search results comprising a plurality of images that are responsive to the search query;
provide the search results including the image search results, including each of the plurality of images that are responsive to the search query;
receive user interface input that indicates a selected image of the plurality of images that are responsive to the search query;
determine, based on the search query, a location of at least one zoom region in the selected image, each of the at least one zoom region being selectable to cause a view of the selected image to be automatically zoomed in such that the location in the selected image is centered and enlarged in the view; and
provide, for each of the at least one zoom region in the selected image, a graphical indication of the location of the zoom region within the selected image, the graphical indication being superimposed on the selected image to indicate the location of the zoom region.

16. The computer program product according to claim 15, wherein the program instructions are further executable to:
receive user interface input that indicates a selected zoom region in the selected image; and
in response to receiving the user interface input, adjust a zoom level of the selected image to display a zoomed-in view of the selected image, the location of the selected zoom region within the selected image being centered and enlarged in the zoomed-in view.

17. The computer program product according to claim 15, wherein the determining the location of the at least one zoom region in the selected image comprises retrieving metadata associated with the selected image that indicates the location of the at least one zoom region in the selected image.

18. A system comprising:
a processor, a computer-readable memory, one or more computer-readable storage media, and program instructions collectively stored on the one or more computer-readable storage media, the program instructions executable to:
receive a search query;
perform a search using the search query to identify search results that include image search results comprising a plurality of images that are responsive to the search query;
for a given image of the plurality of images included in the image search results, determine a location of a zoom region in the given image, the zoom region specifying that a view of the given image is to be automatically zoomed in such that the location in the given image is centered and enlarged in the view, wherein the location of the zoom region is determined based on historical data for a plurality of users that reflects prior zooms on the given image for past instances of the given image being returned in response to the search query; and
provide the search results including the image search results, including, for the given image, provide the given image with a zoom level adjusted to display a zoomed-in view of the given image, the location of the zoom region within the given image being centered and enlarged in the zoomed-in view.

19. The system according to claim 18, wherein the program instructions are further executable to:
provide an indication that the given image is zoomed in; and
provide a user interface element to adjust the zoom level of the given image.

20. The system according to claim 18, wherein:
the program instructions are further executable to determine a confidence level associated with the zoom region; and
the zoom level is adjusted to display the zoomed-in view of the given image in response to the confidence level associated within the zoom region satisfying a confidence level threshold.

* * * * *